US006893105B2

(12) United States Patent
Sanger et al.

(10) Patent No.: US 6,893,105 B2
(45) Date of Patent: May 17, 2005

(54) METHOD FOR PRINTING AN IMAGE FROM A HALFTONE BINARY BITMAP USING MULTIPLE EXPOSURES

(75) Inventors: Kurt M. Sanger, Rochester, NY (US); Nelson A. Blish, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 89 days.

(21) Appl. No.: 10/355,600

(22) Filed: Jan. 31, 2003

(65) Prior Publication Data

US 2004/0150684 A1 Aug. 5, 2004

(51) Int. Cl.[7] .......................... B41J 2/205; H04N 1/46; G06K 9/40
(52) U.S. Cl. .......................... 347/15; 358/1.9; 358/512; 382/260
(58) Field of Search .................. 347/15; 358/1.9, 358/3.06, 512, 534, 536; 382/252, 254, 260

(56) References Cited

U.S. PATENT DOCUMENTS

| | | | |
|---|---|---|---|
| 4,630,125 A | 12/1986 | Roetling | |
| 5,164,742 A | 11/1992 | Baek et al. | |
| 5,208,871 A | 5/1993 | Eschbach | |
| 5,250,934 A | 10/1993 | Denber et al. | |
| 5,255,085 A | 10/1993 | Spence | |
| 5,258,854 A | 11/1993 | Eschbach | |
| 5,293,539 A | 3/1994 | Spence | |
| 5,483,351 A | 1/1996 | Mailloux et al. | |
| 5,680,485 A | 10/1997 | Loce et al. | |
| 5,721,625 A * | 2/1998 | Furusawa et al. | 358/3.14 |
| 6,115,140 A | 9/2000 | Bresler et al. | |
| 6,204,874 B1 | 3/2001 | Michelson | |

OTHER PUBLICATIONS

Graphic technology—Graphic arts reflection densitometry measurements—Terminology, equations, image elements and procedures, 1993, p. 7.

* cited by examiner

Primary Examiner—Lamson Nguyen
(74) Attorney, Agent, or Firm—Bus Koplaw Group, P.C.

(57) ABSTRACT

The invention is a method for printing an image (10) from a halftone binary bitmap (12) having pixels (14a–14g) comprising the steps of: creating a feature location identification filter (16) for a halftone binary bitmap image; using the feature location identification filter to map pixel identifications (18a–18g); assigning a location specific exposure (20a–20g) to the mapped pixel identifications; and exposing media using the location specific exposures to create an image (10) on a printer (24).

18 Claims, 6 Drawing Sheets

$$\begin{bmatrix} 0 & 0 & 0 \\ 0 & 0 & 1 \\ 0 & 1 & 0 \\ 0 & 1 & 1 \\ 1 & 0 & 0 \\ 1 & 0 & 1 \\ 1 & 1 & 0 \\ 1 & 1 & 1 \end{bmatrix} \times \begin{bmatrix} -1 \\ 3 \\ -1 \end{bmatrix} = \begin{bmatrix} 0 \\ -1 \\ 3 \\ 2 \\ -1 \\ -2 \\ 2 \\ 1 \end{bmatrix} = \begin{bmatrix} Off \\ OutsideEdge \\ SinglePixel \\ Edge \\ OutsideEdge \\ SingleHole \\ Edge \\ Center \end{bmatrix}$$

METHOD FOR PRINTING AN IMAGE FROM A HALFTONE BINARY BITMAP USING MULTIPLE EXPOSURES

CROSS REFERENCE TO RELATED APPLICATIONS

Reference is made to commonly-assigned copending U.S. patent application Ser. No. 10/356,006, filed Jan. 31, 2003, entitled METHOD FOR PRINTING A COLOR PROOF USING A SPATIAL FILTER, by Kurt M. Sanger; U.S. patent application Ser. No. 10/355,932, filed Jan. 31, 2003, entitled APPARATUS FOR PRINTING A MULTIBIT IMAGE, by Sanger et al., U.S. patent application Ser. No. 10/355,372, filed Jan. 31, 2003, entitled METHOD OF ADJUSTING COLOR IN A COLOR PROOF, by Sanger et al.; and U.S. patent application Ser. No. 10/355,849, filed Jan. 31, 2003, entitled METHOD OF IMAGING MULTIPLE BINARY BITMAPS IN A SINGLE PASS, by Sanger et al., the disclosures of which are incorporated herein.

FIELD OF THE INVENTION

This invention generally relates to a method for printing halftone images and more particularly relates to a method for modifying halftone images at higher resolution by adjusting dot-gain using multiple exposures.

BACKGROUND OF THE INVENTION

A need has existed to filter a bitmap file and image the bitmap file with the filtered image quickly and efficiently. The present invention is designed to filter an image then quantized the images with a set of discrete "n" levels. A need has long existed for a method for making color proofs, which have more resolution than dot-gain on bitmaps.

In a digital printing workflow there is a need to be able to proof the bitmap files being used to make the printing plates. In the current process the customer artwork consisting of contone images, line work, and text, is first sent to a digital halftone proofer or inkjet printer. The artwork is corrected until the proof is approved for the press. In the case were the artwork is proofed on a digital halftone proofer such as described in U.S. Pat. No 5,164,742, the raster image processor (RIP) adjusts the input continuous tone data using a calibration dot-gain curve such that the tone-scale of the proof matches the tone-scale of the press-sheet. After the proof is approved the job is sent to a second RIP that applies a second dot-gain curve for generating the plate used in the press run. The first and second RIPs may be the same but are typically separate and may be located apart from each other. The first and second RIPs are preferably the same type and version such that the halftone dots created and algorithms used by each device are an exact match, however, many times the two RIPs do not match exactly. Sometimes incorrect dot-gain correction files are used. Sometimes the artwork is changed in-between creating the proof and the plates and the press run no longer matches the approved proof.

Another disadvantage in the current system is that an error in the creation of the bitmaps for printing is not known until the plates are loaded onto the press and the press run is started. For a press capable of over 1,000 impressions per hour considerable amount of production is lost if the plates are found to be corrupt and need to be remade.

An important aspect in creating a halftone proof is predicting dot-gain or tone-scale. Dot-gain is a known phenomenon attributable to ink spread, ink absorption by the print media, and optical effects between the ink and the paper. The dot-gain varies with the size and shape of the halftone dots, the printing device, the inks, and the paper used, etc. For a digital proof, halftone dots in a color separation are composed of micro-pixels that give the halftone dot its shape and size. Dot-gain for a digital proof corresponds to increasing dot size by adding micro-pixels. Dot-loss for a digital proof corresponds to decreasing dot size by eliminating micro-pixels. Dot-gain correction consists of adding and subtracting gain to match the response at different percent dot inputs.

In the printer described in U.S. Pat. No. 5,164,742 many steps are required to match the press. First, the exposure for each color plane is adjusted to match the solid area density. Second, the dot-gain for each color plane is adjusted to achieve a dot-gain match at different halftone tint levels. Third, the dot-gain curves and density levels may be fine-tuned to achieve either a good neutral match in the three-color overprints or a color match of the flesh tones. For some work other memory colors such as green grass or light blue sky may be matched as the critical color. Finally, the dot-gain curves may be further adjusted to deliver better performance in the highlight, or shadow areas. These steps are critical and typically take much iteration between the proof operator and the customer to achieve the look that the customer desires. It is important to be able to adjust the proofer to achieve this look as there are other controls on the press that may be adjusted to affect the dot-gain and tonal control of the press run. By adjusting the performance of the proofer, the customer is selecting the quality of the proofs that will be used by the pressmen to match.

Once the proofer has been setup to match the press, the customer uses subsequent proofs to setup the press. This is an important point. The proofer setup is used to simulate the press such that the pressman may then use the proofs to setup the press to achieve the customer's intent. Every job going through the proofer will be adjusted with a setup. There may be different setups for each press or press type. There may also be different setups for different customers using the same proofer. Finally, there may also be standard setups that are used to simulate jobs across many different presses.

The same job is typically ripped again when going to press. This time the RIP is programmed to generate 50% area coverage on plate for the 50% color input. The press is then run to deliver a fixed amount of gain at the 50% input level. Dot-gain is due to the smearing of the ink from the plate to a blanket, the smearing of ink from the blanket to the job paper, and the optical gain of the ink on top of the paper. The control is usually split between the plate-making device delivering 50% area coverage for a 50% input, and the press delivering 50% plus its intrinsic dot-gain. Typical dot-gain levels for a web-fed offset press are 15% to 25% at the 50% input level. Because the dot-gain occurs on the press instead of at the plate writer, the bitmaps used to create the plate will not contain enough gain to make the proof. Proofs made from these bitmaps will be washed out and the contrast will be significantly reduced. Colors will also shift, as the gain in each color will be proportional to the dot area coverage.

Other digital halftone printing devices such as that disclosed in U.S. Pat. No. 6,204,874 use a binary proofing media that does not allow for adjusting the density level of the solid colorants. A different process is used to adjust these devices for a close press match, including adjusting the tone-scale or dot-gain curve used to make the bitmap file. However, the ideal dot-gain curve on these systems is still different from the dot-gain curves used to make the plates, even if the same machine is imaging the plate and the proof as disclosed in U.S. Pat. No. 6,204,874.

Inkjet printing devices are also sometimes used to make a proof These devices typically image from 300 dpi to 1440 dpi writing resolutions using multiple cyan, magenta, yellow, and sometimes black inks. In addition, software such as "Best Screen Proof" available from Best Gmbh, or Black Magic available from Serendipity Software Pty. Ltd., may be used to simulate the printing of a halftone screen. This software attempts to measure the halftone screen and adjust the printed output to achieve a close color match to a given target. Resolution of the inkjet devices does not allow for a good match of the halftone dot structure. The color match developed does simulate the tone-scale or dot-gain correction, but only through the driving of the overlapping colors on the proof. The quality of the halftone in the printed proof is significantly compromised. Dots in the highlight and shadow areas are destroyed in trying to match the overall density level in these systems. This is because the inkjet output drops are too large. Therefore, one inkjet drop is used to replace many halftone dots in the highlight or bright areas, while one inkjet hole is used to replace many halftone holes in the shadows.

A halftone screen at 150 lines per inch, 6 lines per mm, covers an area of approximately 28,674 um$^2$. An inkjet printer with a 3 pL drop size will produce a dot with a diameter of about 25 um covering an area of 625 um$^2$. This may vary depending upon the spread into the paper. A single inkjet drop represents a 2.18% change in area within a 150-line screen halftone. To achieve finer resolution the Best Screen Proof, and Black Magic, software use additional inks to image multi-level colorants. Typically a light cyan and light magenta ink are added to the cyan, magenta, yellow, and black primaries to achieve finer control of the tone-scale. While this creates a proof with a close visual color match, the structure of the halftone dots within the image is seriously degraded.

The conventional proofing solution, using the a direct digital color halftone proofer, is to RIP the file for proofing separate from ripping the file for printing, adding dot-gain to the proofing file as part of the ripping process. U.S. Pat. No. 5,255,085 discloses a method to adjust the tone reproduction curve of a press or output printer. This method creates a target from the press or desired output proof, benchmarks the characteristics of the proofing device, and generates a lookup table to adjust the dot-gain of the original file to achieve the aim on the proofing device. U.S. Pat. No. 5,293,539 adds adaptive process values to interpolate between measured benchmark and aim data sets to calibrate the dot-gain tone-scale curve at other screen rulings, screen angles, and dot shapes. Utilizing these techniques to modify the dot-gain curves and hence the tone-scale curves of the proofing device increases the chances for error. The input file and its subsequent components must be available for both RIPs. The same versions of each file and components must be specified. The same fonts must be available for both RIPs. The correct dot-gain curve must be specified at both RIPs. The chances for error to occur increase with each ripping operation, especially when the RIPs are located at separate sites.

Ripping the file twice is also time consuming. Each RIP operation must read the input files, decide where each of the components is to be placed in the output print, convert continuous tone images using the correct dot-gain curve into high resolution halftones, render text and line work, and output a high resolution bitmap which represents the composite image. This is repeated for each color in the output print.

Current direct digital color halftone proofers implement dot-gain by modifying the code values being printed through a curve prior to converting the code values into the halftone bitmap with the raster image processor (RIP). The dot-gain is only applied to the continuous tone image data and not the line work or text. The dot-gain may be adjusted for each of the primary colors cyan, magenta, yellow, and black. A dot-gain curve may also be specified for spot colors orange, green, red, blue, white, and metallic. A dot-gain curve may also be specified for a recipe color that is imaged using a single bitmap in combination of two or more standard colors at unique exposure levels. A dot-gain curve may also be specified for each colorant within a recipe color. In this last case more than one bitmap is used, however the halftone dots are at the same screen ruling, screen angle, and phase, such that each halftone dot in each color substantially overlap.

The dot area is calculated using the Murray-Daives Equation, $$\text{PercentArea} = (10^{-D_{tint}} - 10^{-D_{paper}})/(10^{-D_{solid}} - 10^{-D_{paper}}).$$

A typical example, when a target curve is known, might specify that the 50% cyan halftone should print at 67%, the 25% cyan halftone should print at 35%, and the 75% cyan halftone should print at 80%. A benchmark proof is then run and measured. It is possible to measure 30%, 60%, and 79% cyan dot area coverage at the 25%, 50%, and 75% input levels. Dot area is calculated based on measured density using the equation defined by Murray-Davies. The Murray-Davies equation is defined in ANSI/CGATS, 4-1993, 1993, p. 7. A dot-gain adjustment curve is then created to add the correct amount to cyan to achieve the target values at the target inputs. For instance in this example it may be found that an output value of 35% was achieved at an input level of 30% in the benchmark proof. Therefore, adding 5% dot-gain at the 25% input level to achieve the 35% target is needed. At the 50% level it may be found that the target level of 67% at an input level of 57% requiring the addition of 7% at the 50% input has been achieved. At the 75% level it may be found that the 80% target at the 76% input requiring 1% dot-gain has been achieved. In actual practice measuring the dot-gain in 5% or 10% steps with some additional measurements between 0 to 10% and 90 to 100% may be done. An sp-line curve is usually fit to the resulting dot-gain curve to provide a table in 1% input increments or less. Smoothing is sometimes performed on the input target and benchmark data to further reduce artifacts in the adjustment process.

Perup Oskofot has disclosed at Drupa 2000 a software program, which operates on high resolution scans from their scanners. The program takes a binary high-resolution scan of a halftone film and de-screens it to a lower resolution continuous tone image. Typically the scan resolution is 2400 dpi. The resulting continuous tone image may be 8-bits per pixel at 300 dpi resolution. A dot-gain curve is then applied to the de-screened image. The adjusted image is then reripped to a bitmap image at 2400 dpi. One problem with this method is that it requires a reripping step. Plus it must be known what the original halftone screen shape, screen ruling, and screen angle were in order to faithfully reproduce it with the reripping step. Another problem is that all RIPs are not the same.

There are subtle differences between them such as the method that they use to add noise to hide the quantization affects in screening the image. This means that one RIP may not sufficiently reproduce all the screens that the customer might digitize. Another problem with this method is that it is extremely slow. A small 8×10 inch image at 2400 dpi scanned resolution may take more than an hour to process a single color plane.

Additionally, some customers have halftone films, which they would like to use in their digital workflow. These customers scan the film at a high resolution, 100 pixels/mm, and quantize each pixel to a binary value. Because the dot-gain is built into the film, there is no method other than de-screening the bitmap file, adding dot-gain, and reripping the file, to calibrate the output print. If the original film was made using an optical technique then the dot shape, screen ruling, and screen angle may not be an exact match to a digital RIP. De-screening and re-screening the high-resolution scan may not faithfully reproduce the original screens.

U.S. Pat. No. 5,250,934 discloses a method of shifting and adding a bitmap image with itself to thin the image displayed. U.S. Pat. No. 5,250,934 also discloses a method of setting a bit to an intermediate level if it is diagonally between two active bits using shifting, logical and, and a logical or operation.

U.S. Pat. No. 5,483,351 discloses using a 4×4 input to a lookup table to determine how to operate on the central 2×2 pixels to implement half bit or full bit dilation and erosion in U.S. Pat. No. 5,483,351. U.S. Pat. No. 5,483,351 has the advantage of knowing some of the surrounding pixels in deciding how to dilate or erode the pixels in the center.

U.S. Pat. No. 5,258,854 teaches how to resize bitmap images in small amounts less than one full bit in size. U.S. Pat. No. 5,680,485 discloses logically combining two morphological filter pairs and an original image to create an output image. The morphological filters described are erosion filters, one of which has less erosion than desired and the other having more erosion than desired. Logically combining combinations of the original image with the two eroded images provides for a method of obtaining an intermediate result.

U.S. Pat. No. 5,208,871 describes a method of resizing an input bitmap. U.S. Pat. No. 5,208,871 simulates a scan of an output image from an input bitmap such that the scan resolution is different from the input bitmap. Error diffusion is utilized to quantize the output bitmap into the desired output bit resolution. This example uses error diffusion to spread out the error in the quantization of a multilevel pixel into a reduced number of output states.

U.S. Pat. No. 6,115,140 uses a de-screened version of an original image, and dilated and eroded versions of the original image to select a combination of the original, dilated, and eroded images to effect a dot-gain or tone-scale change in an input bitmap image. U.S. Pat. No. 6,115,140, FIG. 5B, shows an original halftone image input into block HI along with an eroded version (HE), and two dilated versions (HD1 and HD2). Then a weight based on de-screened versions of the original halftone (CO), the color corrected original (CI), the eroded original (CE), and the two dilated originals (CD1 and CD2) is calculated. The de-screened images are used to select which of the four halftone images, HI, HE, HD1, and HD2, are transferred into H1 and H2. The weighting function is then used to merge bitmap versions of H1 and H2 together into the tone-scaled output bitmap (HO). How to de-screen is not disclosed, nor exactly how to calculate which bit of H1 and H2 is used to drive the output bit HO. The need to use error diffusion to distribute the error in selecting between H1 and H2 is not mentioned.

In U.S. Pat. No. 6,115,140 dilation is described as growing a single pixel completely around the halftone feature. A second dilation grows two pixels completely around the halftone feature. Similarly erosion subtracts a single pixel completely around the halftone feature.

None of U.S. Pat. No. 6,115,140 references teach how to perform de-screening. U.S. Pat. No. 4,630,125 performs de-screening by comparing the number of white and dark pixels within a specified area U.S. Pat. No. 4,630,125 also states "A partial solution known in the art is to spatially filter the halftone image with a low pass filter." U.S. Pat. No. 4,630,125 teaches that the spatial filter method is not exact as it tends to blur the original image.

In correcting for the tone scale of the image using the previous techniques the size of the written halftone dot is changed in the bitmap image to generate a print with the correct measured density. There exists a need to correct the tone-scale or dot-gain of the image without changing the size of the halftone dot to generate a proof that more closely matches the press sheet.

Thus, there exists a need for optimizing the process of adding dot-gain while maintaining dot fidelity. A system that adds dot-gain to the bitmaps used to make the printing plates and proofs these bitmaps so that the press-sheets made with same printing plates are known prior to running the plates on press does not exist.

SUMMARY OF THE INVENTION

The invention relates to a method for printing an image from a halftone binary bitmap having pixels comprising the steps of first, creating a feature location identification filter for a halftone binary bitmap image. Next, the feature location identification filter is used to map pixel identifications. A location specific exposure is then assigned to the mapped pixel identifications. Media is exposed using the location specific exposures to create an image on a printer.

In the invention, the feature location identification filter is preferably a filter created by the steps: assigning pixels to address bits of a lookup table; forming a lookup table by creating a set of all possible addresses for the pixels and mapping the set of addresses to a feature of a halftone dot forming mapped address bits; and then assigning a value to each feature of a halftone dot using the mapped address bits to create an output.

DETAILED DESCRIPTION OF THE INVENTION

Figure 1:
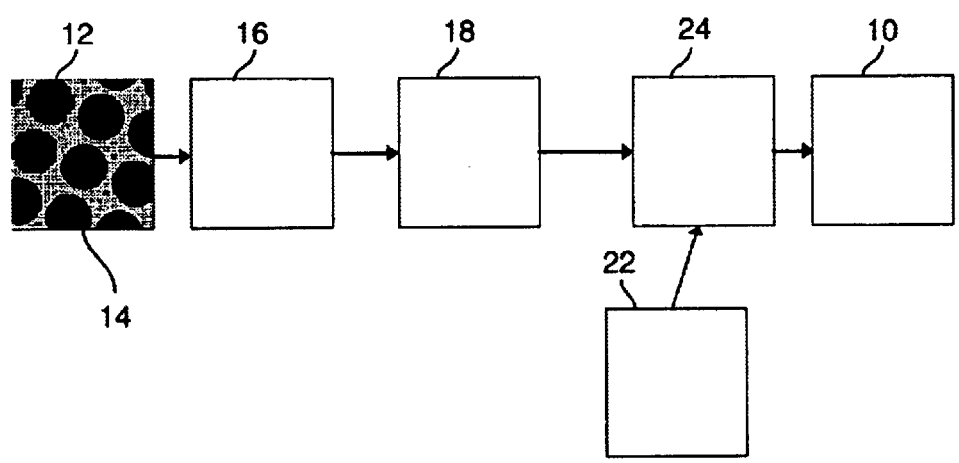
FIG. 1 is a diagrammatic view of the method of the invention.

The invention is described below in detail with particular reference to certain preferred embodiments thereof, but it will be understood that variations and modifications can be effected within the spirit and scope of the invention Referring now to FIG. 1, which depicts the method of the invention for printing an image, it is shown that an image 10 can be printed from a halftone binary bitmap 12 having pixels 14. The halftone binary bitmap 12 can be an image, such as a digital image, line work or text. The digital images can be color, or black and white images. The images may be continuos-tone, multi-level, or binary. The halftone binary bitmap 12 can be output from a raster image processor (RIP). It can be a customer plane, such as cyan, magenta, yellow and black. It can consist of customer artwork which is composed of pages using software such as Quark Express or Adobe InDesign. Every halftone binary bitmap 12 will have a halftone screen ruling and angle. The binary data will be at the writing resolution of the output printer 24.

The steps of the method include first creating a feature location identification filter 16 for the halftone binary bitmap 12. The purpose of this filter is to map each pixel with an identifier to classify where the pixel is with respect to a halftone dot within the halftone binary bitmap. Many pixels 14 will be used to compose each halftone dot. For example pixels may be outside, inside, or on the edge of the area of a halftone dot.

Figure 2:
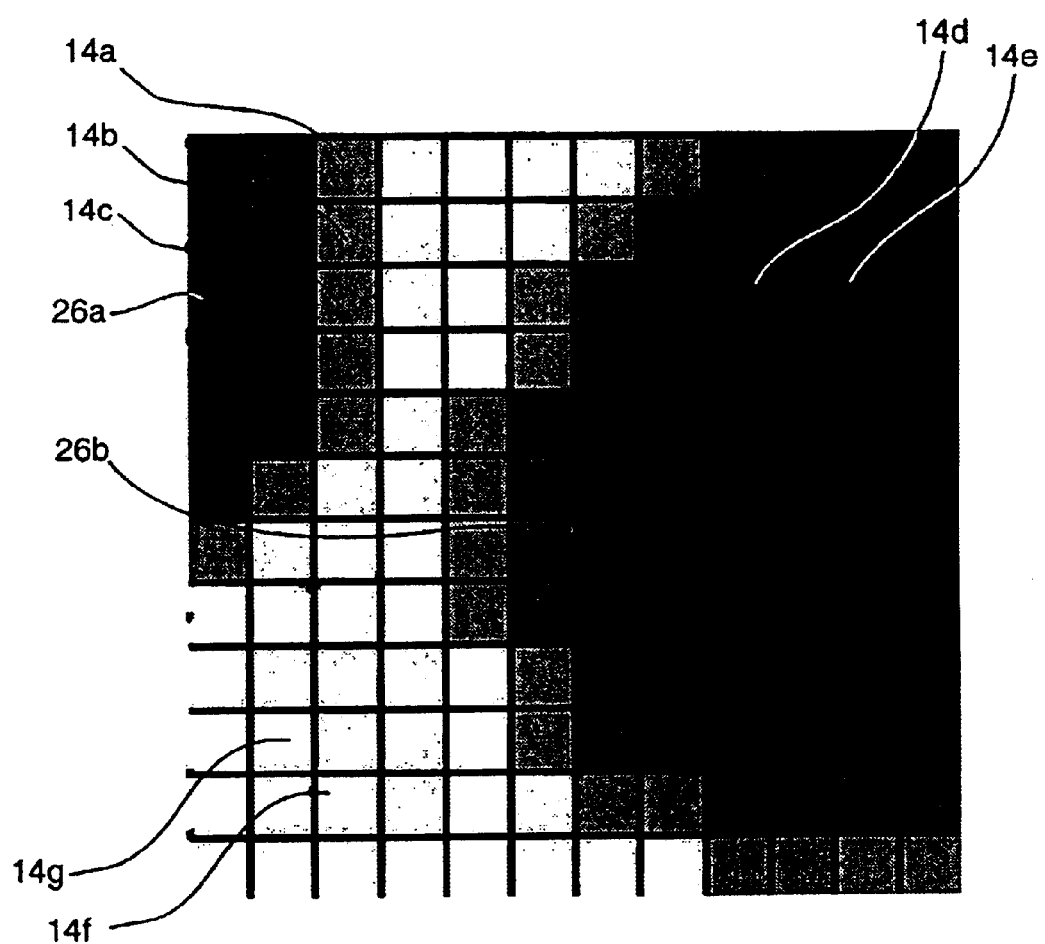
FIG. 2 is a detailed view of a portion of the halftone binary bitmap.

FIG. 2 shows an example halftone binary bitmap 12 composed of pixels 14 creating a halftone dots 26a and 26b. Pixels 14a, 14b and 14c represent pixels on the edge of halftone dot 26a. Pixels 14d and 14e are in the center of halftone dot 26b. Pixels 14f and 14g are outside the area of the halftone dots 26a and 26b. These locations are called half tone dot features. Each pixel has a multilevel value for identifying each significant feature.

Figure 3:
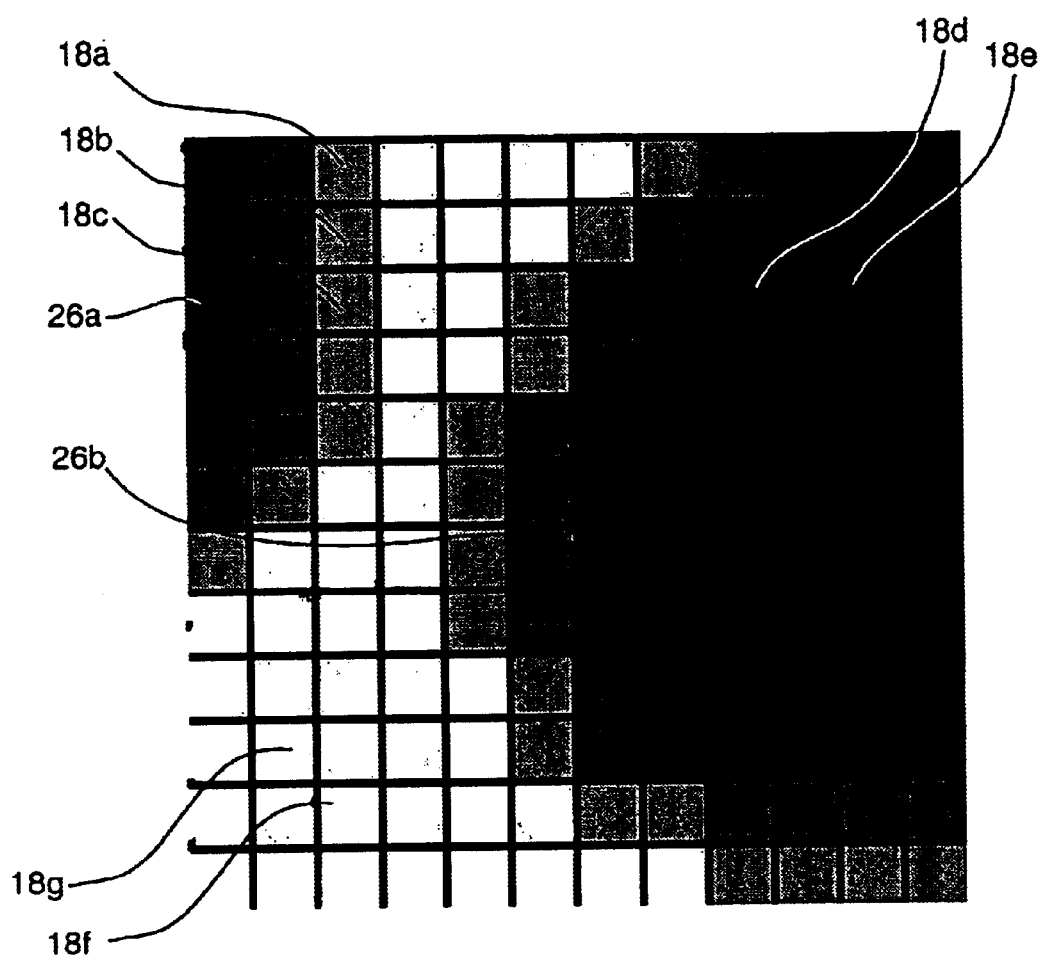
FIG. 3 shows pixel identifications.

The feature location identification filter is used to map pixel identifications 18, one or more features, for each half tone dot of the halftone bitmap. In FIG. 3, the pixel identifications 18 are represented by different pixels features 18a–18g, such as the pixel edge, the pixel center corresponding to the position the pixel is in relative to the halftone dots 26a and 26b. There is a one to one mapping relationship between pixels of FIG. 2 and the pixel identifications of FIG. 3.

Figure 4:
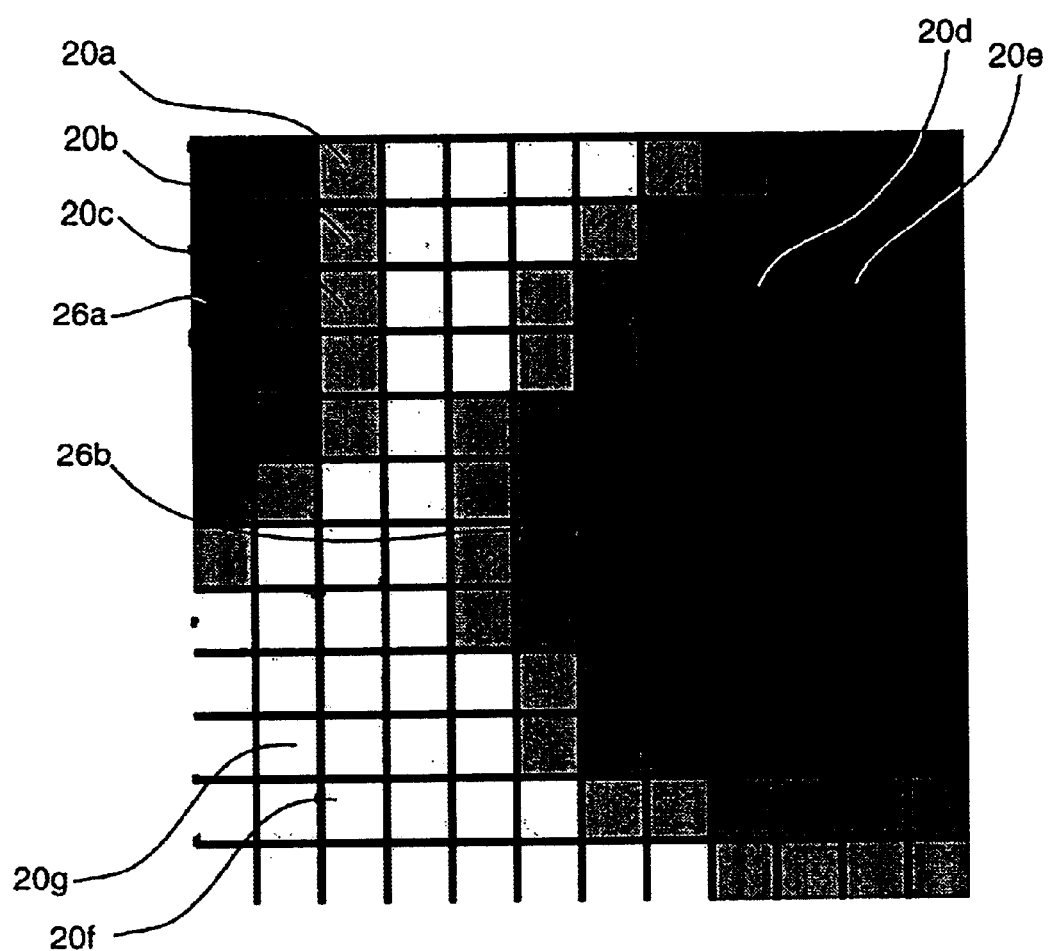
FIG. 4 shows location specific exposures.

Next, a location specific exposure 20 is assigned to the mapped pixel identifications. FIG. 4 shows the corresponding locations specific exposures for each pixel identification shown in FIG. 3. "Off" is shown in the squares indicated as element 20f and 20g. Off is also outside the dot. The edge exposure level is shown in the squares indicated as elements 20a, 20b, and 20c. The inside of the dot exposure level is indicated as 20d and 20e. The single dot exposure level is not shown but would consist of a single "on" pixel surrounded by "off" pixels.

Finally, media 22 is exposed using the location specific exposures of FIG. 4 to create an image 10 on a printer 24. The types of printers which can be used in this invention are contemplated to be laser printers, such as a multilevel printer laser printer capable of printing at a dpi between 1400 and 4000, preferably between 1800 and 4000 dpi. It is contemplated that a Kodak approval XP printer could be used with the modification to pulse width modulate the lasers up to sixteen levels for each pixel at 2540 dpi using colors cyan, magenta, yellow and black. It is contemplated that the individual exposures can be set for each of the sixteen levels for each color plane. This means, the exposures can be flexibly changed with this system.

Figures 5, 6:
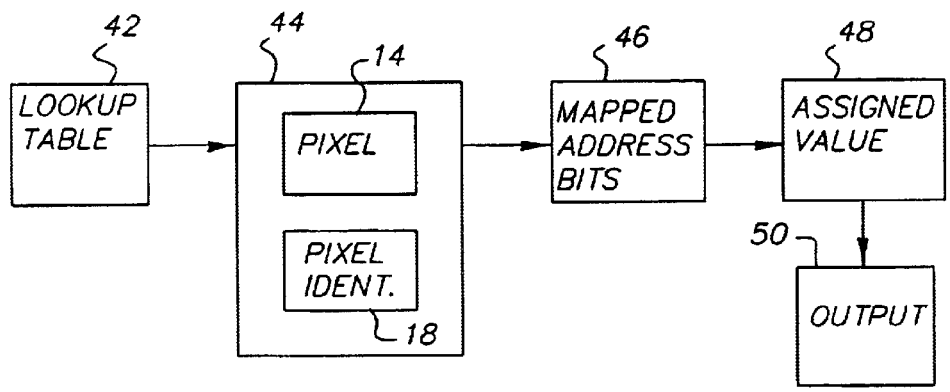
FIG. 5 is a representation of the feature location identification filter.
FIG. 6 is a representation of the method for making the filter of FIG. 5.

FIG. 5 shows yet another embodiment of the invention. In FIG. 5 the feature location identification filter 16 has all possible inputs 30 for three pixels to the filter. All possible outcomes 32 are shown as the result of the filtering of the inputs. These outcomes 32 may be classified as features 18. The features 18 in this embodiment can be "off" 33; outside edge 34; single pixel 35; edge of halftone dot 36; outside edge of halftone dot 37; single hole outside of halftone dot 38; edge of halftone dot 39; and center of halftone dot 40.

FIG. 6 reveals that the method uses a feature location identification filter 16 can be created by the steps involving:
a) assigning pixels to address bits of a lookup table 42;
b) forming a lookup table by:
 i) creating a set of all possible addresses for the pixels 14; and
 ii) mapping the set of addresses 44 to a feature 18 of a halftone dot forming mapped address bits 46; and
c) assigning a value 48 to each feature of a halftone dot using the mapped address bits to create an output 50. In this embodiment of the method, the lookup table 42 can utilize pixels which are not adjacent to each other to create a set of possible addresses.

Figure 7:
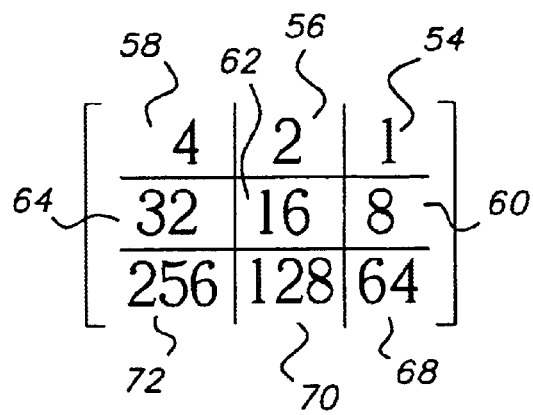
FIG. 7 shows how an array of pixels can be used to create a 9 bit address.

FIG. 7 shows how a 3×3 array of pixels can be used to create a nine bit address, using pixels 54, 56, 58, 60, 62, 64, 68, 70, 72 are shown. A five bit address could also be created from this 3×3 array by using pixel 56, 60, 62, 64, and 70 to identify half tone dot features along the axis of the selected five pixels. When five bits are used, the subsequently created lookup table is smaller than the nine bit table. A 5×5 array of pixels can also be used to identify more features of a halftone dot, such as pixels which are at the edge versus pixels in the center of a half tone dot.

It is also contemplated as that the feature location identification filter can be a lookup table created by the steps: creating a set of all possible addresses for the pixels, and mapping the set of address to a feature of a halftone dot forming mapped pixel address bits, wherein addresses for pixels are composed of adjacent pixels, and the lookup table is adapted to provide mapped pixel identifications.

This method contemplates that the filter can be composed of pixels in one direction, or in two directions.

Based on the teaching above, the method contemplates that the lookup table is a table comprising between 3 and 25 bits.

As a variation to the method, the assigned location specific exposure can be greater for an edge of the halftone dot than a center of the halftone dot.

As another variation in this method, the assigned location specific exposure can be greater for an edge of the halftone dot than a center of the halftone dot.

Location specific exposures can be set by calibrating each of the halftone features to the screen ruling and angle of the original binary halftone bitmap.

The invention is designed to image the bitmap such that the image 10 is calibrated to another printing device. This device may be a press, either sheet fed or web fed. It may also be another printer.

Figure 8:
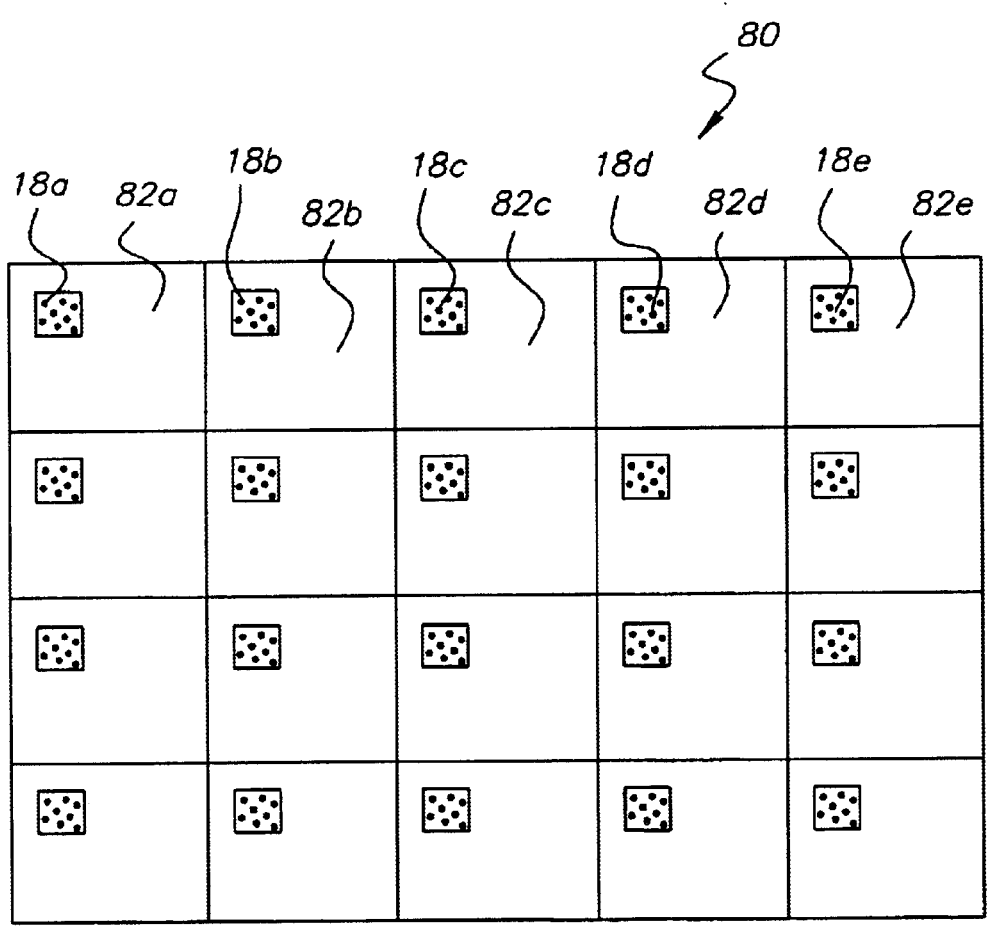
FIG. 8 shows a method for building a target used in the method of the invention.

The location specific exposure is set by first, for each feature 18 starting with the smallest, compose a target 80. The target is built by first creating a tile 82a, the same size as the filter 16 containing only one feature 18a. The step is repeated with additional tiles and the same feature, 82b and 18b, tile 82c and features 18c, tile 82d and feature 18d, tile 82e and feature 18e and so on until the target is filled with tiles. A preferred embodiment contemplates using a target having a ½ inch by ½ inch area. This target building is shown in FIG. 8.

Next, each target is printed at different exposure levels forming a calibration output. The calibration output is measured for density at each different exposure level forming a density measurement for each different exposure level.

The density measurements are converted to a dot-gain for each different exposure level. Dot-gain is measured using the Murray-Davies equation. The percent dot of the target is equal to the number of pixels in the tile divided by the size of the tile in pixels. Then subtracting the measured percent dot from the percent dot of the target, then the dot-gain is determined. The halftone bitmap has a screen ruling and an angle that the bitmap was created too. When the feature in the current target appears in the halftone bitmap it will be at the screen ruling. Therefore, the percent dot when the feature appears is equal to the size of the feature multiplied by the screen ruling squared. For the identified feature and the equivalent percent halftone dot, the exposure is set to achieve the dot-gain desired at this equivalent percent halftone dot to match the other printing device.

This calibration process is performed on the smallest feature first, in the preferred embodiment, then using the exposure for the smallest feature, then this calibration process is repeated for each subsequently larger feature.

In a preferred method of the invention, the target is composed of a feature within an area to be filtered by the feature location identification filter.

In yet another embodiment of the method, the location specific exposure for a single dot exposure can be adjusted to be greater than the average exposure of dots in the halftone binary bit map.

The method of the invention contemplates performing this process separately in each color plane in a color printer.

The invention has been described in detail with particular reference to certain preferred embodiments thereof, but it will be understood that variations and modifications can be effected within the scope of the invention.

PARTS LIST

10. Image
12. Halftone binary bitmap
14. Pixel
14a. Pixel
14b. Pixel
14c. Pixel
14d. Pixel
14e. Pixel
14f. Pixel
14g. Pixel
16. Feature location identification filter
18. Pixel identifications (or features)
18a. Pixel identifications (or features)
18b. Pixel identifications (or features)
18c. Pixel identifications (or features)
18d. Pixel identifications (or features)
18e. Pixel identifications (or features)
18f. Pixel identifications (or features)
18g. Pixel identifications (or features)
20. Location specific exposure
20a. Location specific exposure
20b. Location specific exposure
20c. Location specific exposure
20d. Location specific exposure
20e. Location specific exposure
20f. Location specific exposure
20g. Location specific exposure
22. Media
24. Printer
26a. Halftone dot
26b. Halftone dot
30. Input
32. Outcomes
33. Off
34. Outside edge
35. Single pixel
36. Edge of halftone dot
37. Outside edge of halftone dot
38. Single hole outside of halftone dot
39. Edge of halftone dot
40. Center of halftone dot
42. Lookup table
44. Set of addresses
46. Mapped address bits
48. Assigned value
50. Output
54. Pixel
56. Pixel
58. Pixel
60. Pixel
62. Pixel
64. Pixel
68. Pixel
70. Pixel
72. Pixel
80. Target
82a. Tile
82b. Tile
82c. Tile
82d. Tile
82e. Tile

What is claimed is:

1. A method for printing an image from a halftone binary bitmap having pixels comprising:
   a) creating a feature location identification filter for said halftone binary bitmap;
   b) using said feature location identification filter to map pixel identifications;
   c) assigning a location specific exposure to each of said mapped pixel identifications; and
   d) exposing media using said location specific exposures to create an image on a printer.

2. The method of claim 1, wherein said feature location identification filter is a filter created by the steps comprising:
   a) assigning pixels to address bits of a lookup table;
   b) forming said lookup table by:
      i) creating a set of all possible addresses for said pixels; and
      ii) mapping said set of addresses to a feature of a halftone dot forming mapped address bits; and
   c) assigning a value to each feature of said halftone dot using said mapped address bits to create an output.

3. The method of claim 2, wherein said feature said pixel represents is selected from the group comprising: off, outside dot, single dot, edge of the dot, and inside of a dot.

4. The method of claim 3, wherein said location specific exposure for a single dot exposure can be adjusted to be greater than the average exposure of dots in said halftone binary bitmap.

5. The method of claim 2, wherein said lookup table is a table comprising between 3 and 25 bits.

6. The method of claim 5, wherein said lookup table is a 25 bit table.

7. The method of claim 2, wherein said assigned location specific exposure is greater for an edge of said halftone dot than a center of said halftone dot.

8. The method of claim 2, wherein said location specific exposure is set by:
   a) identify a screen ruling and an angle from said halftone binary bitmap;
   b) for each feature starting with the smallest, compose a target;

c) print each target at different exposure levels forming a calibration output;

d) measure said calibration output for density at each of said different exposure level forming a density measurement for each different exposure level;

e) convert said density measurements to a dot-gain for each of said different exposure level;

f) calculate an equivalent percent halftone dot for each feature of said halftone dot at said screen ruling and said angle;

g) identify a desired halftone dot-gain for each of said calculated equivalent percent halftone dot; and h) set said location specific exposure for said feature to obtain said desired halftone dot-gain.

9. The method of claim 8, wherein said target is composed of said feature within an area to be filtered by said feature location identification filter.

10. The method of claim 1, wherein said feature location identification filter is a lookup table created by the steps comprising:

a) creating a set of all possible addresses for said pixels; and b) mapping said set of address to a feature of a halftone dot forming mapped pixel address bits, wherein addresses for pixels are composed of adjacent pixels, and said lookup table is adapted to provide mapped pixel identifications.

11. The method of claim 10 wherein said feature said pixel represents is selected from the group comprising: off, outside dot, single dot, edge of the dot, and inside of a dot.

12. The method of claimed 11, wherein said location specific exposure for a single dot exposure can be adjusted to be greater than said average exposure of dots in said halftone binary bit map.

13. The method of claim 10, wherein said assigned location specific exposure is greater for an edge of said halftone dot than a center of said halftone dot.

14. The method of claim 10, wherein said location specific exposure is set by:

a) identify a screen ruling and an angle from said halftone binary bitmap;

b) for each feature starting with the smallest, compose a target;

c) print each target at different exposure levels forming a calibration output;

d) measure said calibration output for density at each of said different exposure level forming a density measurement for each different exposure level;

e) convert said density measurements to a dot-gain for each of said different exposure level;

f) calculate an equivalent percent halftone dot for each feature of said halftone dot at said screen ruling and said angle;

g) identify a desired halftone dot-gain for each of said calculated equivalent percent halftone dot; and h) set said location specific exposure for said feature to obtain said desired halftone dot-gain.

15. The method of claim 14, wherein said target is composed of said feature within an area to be filtered by said feature location identification filter.

16. The method of claim 1, wherein said filter is composed of pixels in one direction.

17. The method of claim 1, wherein said filter is composed of pixels in two directions.

18. The method of claim 1, wherein said printer is a color printer.

* * * * *